United States Patent [19]

Cooke et al.

[11] 4,177,727
[45] Dec. 11, 1979

[54] LINE PRINTER CHARACTER CHAIN LUBRICATING DEVICE

[75] Inventors: Theodore M. Cooke, Altamonte Springs, Fla.; Lawrence T. Carian, Clawson; Gunther R. Goetzinger, Detroit, both of Mich.

[73] Assignee: Burroughs Corporation, Detroit, Mich.

[21] Appl. No.: 901,290

[22] Filed: May 1, 1978

[51] Int. Cl.² .................... F16N 7/12; B41J 1/20
[52] U.S. Cl. .......................... 101/93.14; 74/257; 83/169; 118/264; 184/16; 305/14; 401/9; 428/306
[58] Field of Search .......... 101/93.13, 93.14; 74/257; 305/14; 184/16; 83/169; 428/306, 307, 311; 118/264, 270; 401/9, 10, 11, 193, 196, 198, 199

[56] References Cited

U.S. PATENT DOCUMENTS

| | | | |
|---|---|---|---|
| 369,970 | 9/1887 | Stiles | 83/169 |
| 556,786 | 3/1896 | Thompson | 184/16 |
| 1,735,046 | 11/1929 | Harris | 118/270 |
| 2,353,877 | 7/1944 | Chollar | 118/264 |
| 2,800,199 | 7/1957 | Mlynarek | 184/16 |
| 2,810,145 | 10/1957 | Forrow | 401/9 |
| 2,980,942 | 4/1961 | Dabney | 401/10 |
| 3,019,201 | 1/1962 | Clancy | 264/122 |
| 3,033,312 | 5/1962 | Enders | 83/169 |
| 3,370,531 | 2/1968 | Falk | 101/95 |
| 4,069,894 | 1/1978 | Black | 401/11 |

FOREIGN PATENT DOCUMENTS 185256  4/1956  Austria .................................. 184/16

Primary Examiner—Clyde I. Coughenour
Attorney, Agent, or Firm—Carl Fissell, Jr.; Robert L. Kaner; Kevin R. Peterson

[57] ABSTRACT

A low cost line printer character chain lubricating device that provides an accurate amount of lubricant between a line printer character chain and the hard, smooth support surface about which the chain rotates. The lubricating device is located in a depression in the hard, smooth support surface and includes a piece of flexible, abrasion-resistant, microporous nitrile rubber that is impregnated with lubricating oil. The nitrile rubber has a smooth convex arcuate surface for contacting the character chain. A bracket semipermanently mounts the nitrile rubber in the depression in the support surface such that the convex arcuate surface of the nitrile rubber contacts the side of the character chain that normally contacts the hard, smooth support surface as the chain rotates. Depressions in the nitrile rubber beside the arcuate surface serve as charging reservoirs for the lubricating oil. As the line printer character chain rotates and contacts the arcuate surface of the nitrile rubber, the lubricating device provides oil on a need only basis such that an accurate amount of oil is automatically maintained between the chain and the hard, smooth support surface. The size of the micropores in the nitrile rubber, in relation to the lubricating oil used, controls the desired level of lubrication.

4 Claims, 6 Drawing Figures

LINE PRINTER CHARACTER CHAIN LUBRICATING DEVICE

BACKGROUND OF THE INVENTION

This invention relates in general to impact line printers that have a character chain printing mechanism that rotates on a hard support surface and more particularly to the lubrication of such a line printer character chain mechanism.

Impact line printers may print utilizing a rotating chain that has raised linguistic characters, such as alphanumerics, on the exposed exterior surface thereof. For example, in such a printer the character chain may be rotated at a high speed and hammers may be selectively actuated in a properly timed manner to impact selected areas of the paper (or another record medium) such that the paper impacts with a ribbon which then impacts upon the raised linguistic characters on the character chain of the line printer as the characters are in motion. A 1500 line per minute printer may have a character chain that moves at a velocity of 210 inches per second. The chain must move over a hard, smooth support surface such that the chain is firmly supported when impacted. The support surface must also be hard and smooth so that it will not significantly wear down over time and so that the chain will remain taut for proper operation. Commonly, both the character chain and the support surface are made of hardened steel.

Experience has shown that such line printer character chains must be lubricated for proper operation. However, if too little lubricant is provided between the line printer character chain and the hard support surface, the surfaces will heat up and seize together. On the other hand, if too much lubricant is provided between the line printer character chain and the hard support surface, the lubricant will get on the other parts of the line printer, the paper being printed by the line printer, and/or the characters on the chain to cause smudging of the printing.

A known printer character chain lubricating device has an oil reservoir from which oil is dropped at intervals (provided by an electronic timer) upon a felt wick. The oil passes down the wick, one end of which is located under a nylon wear surface which contacts the chains surface. Two little holes in the nylon surface permit the oil from the wick to be pumped onto the surface of the nylon in contact with the chain as the chain passes thereover. Such a system is rather expensive, does not necessarily dispense the proper amount of oil needed, and in general is not as reliable as is desired.

Thus, a line printer character chain lubricating device that provides a precise amount of lubricant on a need only basis would be very desirable. Such a device of course must also be inexpensive, reliable and require little maintenance and downtime.

SUMMARY OF THE INVENTION

The present invention provides a lubricating device that precisely supplies only the desired amount of lubricant between a line printer character chain and the hard support surface about which the character chain is rotated. The character chain lubricating device is located in a depression in the hard support surface and includes a piece of flexible, microporous, polymeric material that is impregnated with a liquid lubricant that is chemically non-reactive to the polymeric material. Means are provided for semipermanently mounting the polymeric material in the depression in the support surface so that a portion of the polymeric material is in contact with the character chain as it passes thereby in rotation. As the chain rotates, the microporous polymeric material maintains a desired amount of lubricant between the hard support surface and the side of the character chain normally in contact with the hard support surface.

The line printer character chain lubricating device according to the present invention automatically provides lubricant only when needed such that a desired level of lubricant is maintained between the character chain and the hard support surface. Thus, if the desired level of lubricant already exists between the chain and the support surface, no further lubricant is automatically provided; but if the desired level of lubricant does not exist between the chain and the support surface, then lubricant is automatically provided as the chain passes over the polymeric material. The desired level of lubricant is provided by appropriately selecting the pore size of the microporous, polymeric material with respect to the nature of the lubricating liquid used. For example, in the preferred embodiment, the microporous, polymeric material is nitrile rubber, the lubricating liquid is Shell Lubricating Oil No. 32, and the micropores are on the average approximately 20 microns in diameter.

The present invention is reliable and long lasting. For example, in a 1500 line per minute printer having a character chain moving at 210 inches per second and having approximately three quarter inch links, the flexible polymeric material will be contacted by a link almost one million separate times per hour of operation. A piece of nitrile rubber polymeric material of the preferred embodiment has been operated for several hundred hours without showing appreciable wear (abrasion resistant) or surface glazing (burnishing). It is anticipated that in normal usage, a lubricating device according to the present invention should have its charging reservoirs filled with lubricating liquid at regular intervals (such as once a month) and can be routinely replaced at longer regular intervals (such as once every several months). Thus, the present invention is reliable, inexpensive, easily replaceable during routine maintenance, and accurately maintains the desired amount of lubricant between the hard support surface and the side of the character chain that normally contacts the hard support surface.

DETAILED DESCRIPTION OF THE INVENTION

Figure 1:
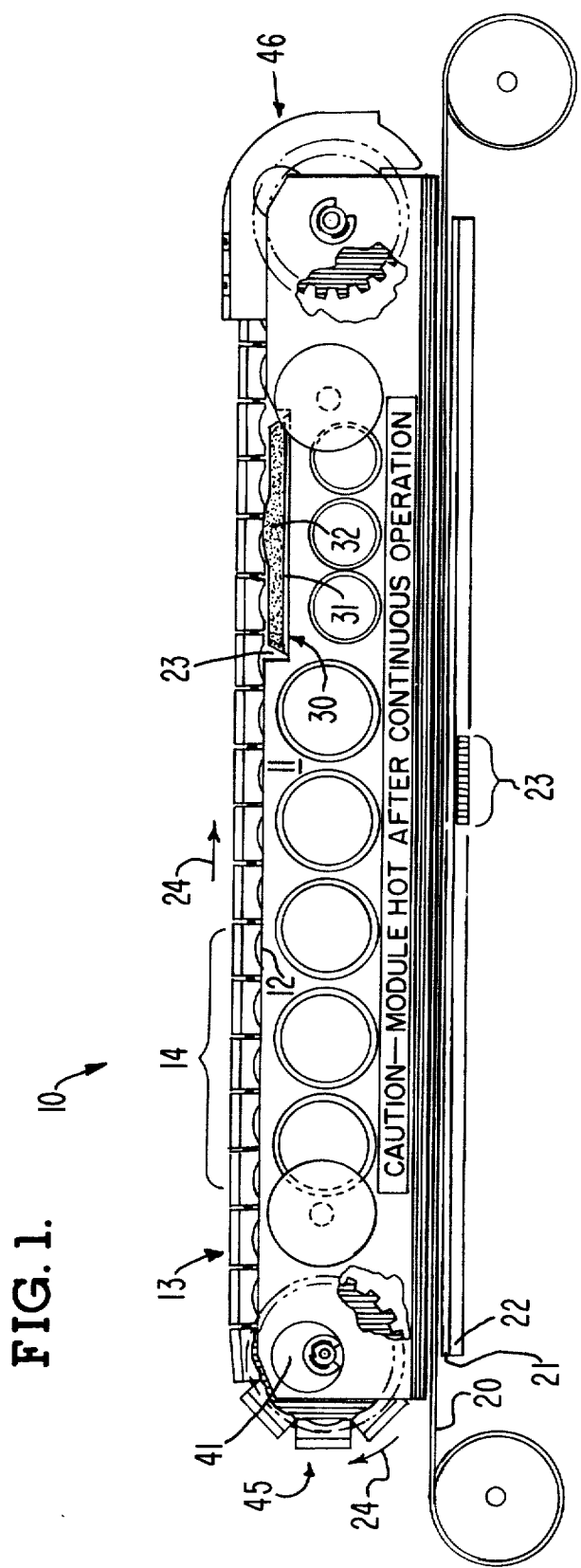
FIG. 1 is a front view of a line printer character chain mechanism having a lubricating device according to the present invention.

FIG. 1 shows a line printer character chain mechanism 10 in front view. The mechanism 10 includes a casting 11 that has a hard, smooth support surface 12 about which the character chain 13, formed by individual links 14, is rotated. In a 1500 line per minute printer, a character chain may rotate at a linear rate of 210 inches per second. Shown below the mechanism 10, in cross section, are an inked ribbon 20, a piece of paper 21 to be printed on and a bank of hammers 22 with some individual hammers of the bank represented at 23. The hammers may be solenoid actuated and there is a hammer for each column to be printed on the paper. As the character chain 13 rotates at a constant velocity, the hammers 23 are selectively actuated to impact the adjacent paper and drive it against the character chain with the inked ribbon 20 therebetween to print the desired characters on the paper. Located in a depression 23 in the hard, support surface 12 is a lubricating device 30 formed by a bracket 31 that holds a piece of microporous, polymeric material 32. The material 32 contacts the side of the links 14 that normally contacts the support surface as the links rotate to provide lubrication.

Figure 5:
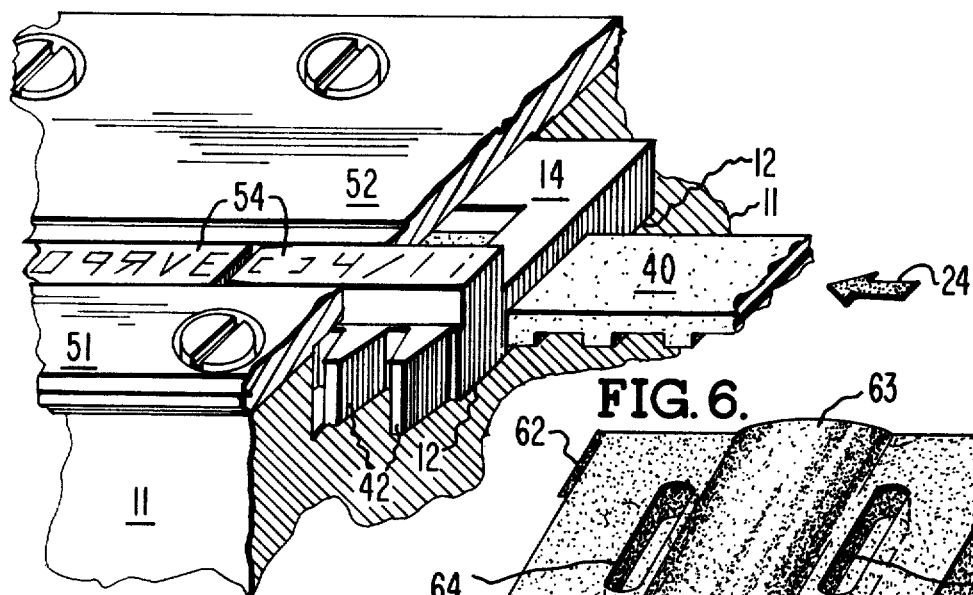
FIG. 5 is an enlarged, perspective view of one of the chain links from below and behind the mechanism of FIG. 1.

Referring to FIGS. 1 through 5, the support surface 12 is smooth and is provided by hardened steel. The chain must move over such a hard, smooth support surface such that the chain is firmly supported when impacted. FIG. 5 shows how the chain links are supported when impacted in more detail. The support surface must also be hard and smooth so that it will not wear down over time such that the character chain will remain taut on the surface for proper operation.

The character chain 13 is formed by links 14 which are mounted on a grooved belt 40. The links and belt rotate about the hard, smooth support surface 12. The support surface is hard and smooth because the chain must move at high speed and yet be fully supported when the links are impacted via the hammers. The chain is mounted taut by initially adjusting the eccentric 41. The chain is directly driven in rotation by engaging the teeth 42 of the links 14 with a mating stationary rotating gear at a location not shown (on the back of FIG. 1).

The links 14 have flat surfaces 43 for contacting the support surface 12 during linear travel (including when the links are impacted via the hammers) and a slightly rounded portion 44 for supporting the links as they turn the corner at 45 or 46. As the links go around the corners at 45 and 46, the link portions 50, which interlock with the grooved belt 40, mate with non-driving, freely rotating gears at each corner to keep the chain in proper alignment on the hard, smooth support surface 12.

FIG. 5 shows a partial, sectional perspective view (upside down from FIG. 1) of a link 14 when it is in the printing position on the character chain mechanism. The link 14 rides on the hard, smooth support surface 12 and guide plates 51 and 52 cover most of the link 14. The links each have an elevated portion 54 which extends between and beyond the plates 51 and 52. This elevated portion has raised characters thereon for impact printing as the chain rotates. Thus, only the portion of the links having the raised characters is exposed during printing. The plates 51 and 52 guide the links while they are in the printing position so that the printing is in a straight line.

Figure 2:
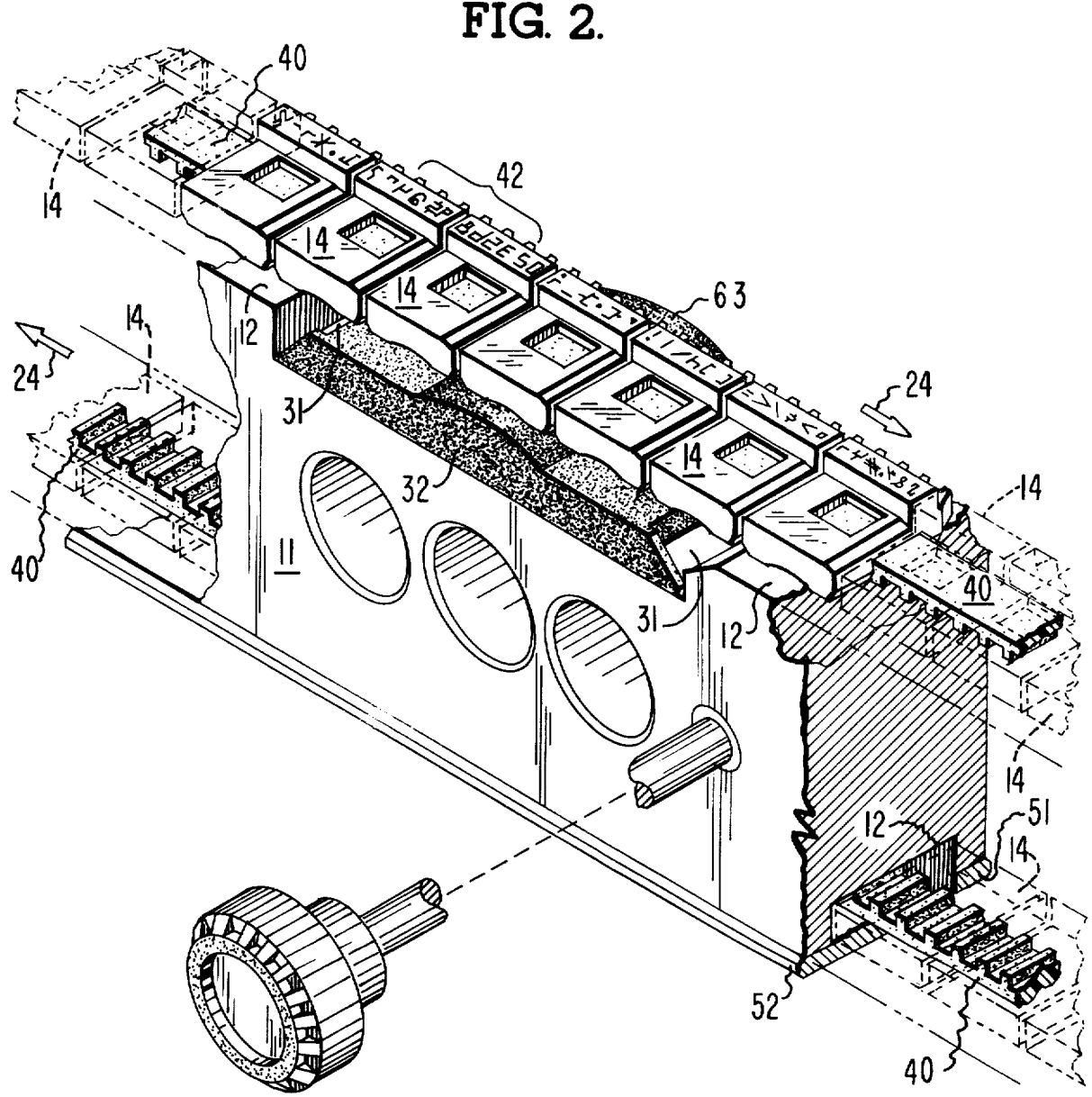
FIG. 2 is an elevated perspective view of the portion of the line printer character chain mechanism having the lubricating device.
Figure 3:
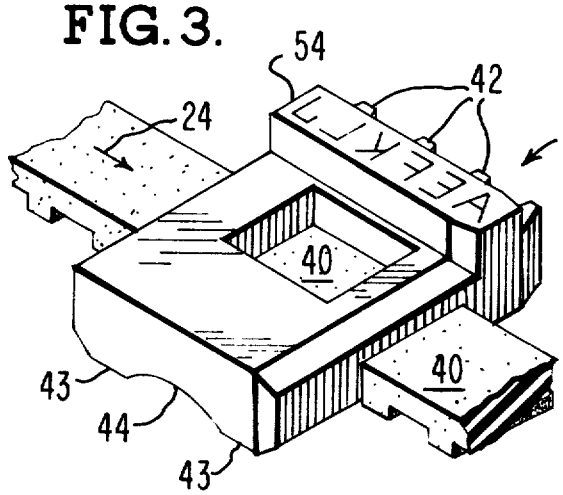
FIG. 3 is an enlarged, elevated perspective view of one of the chain links of FIG. 2.
Figure 4:
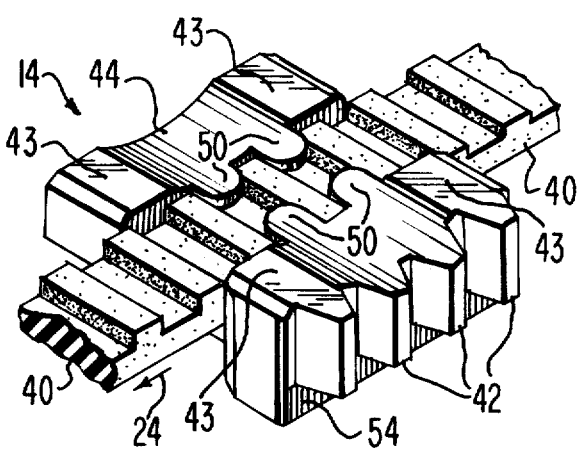
FIG. 4 is a perspective view of the chain link of FIG. 3 from a different direction.
Figure 6:
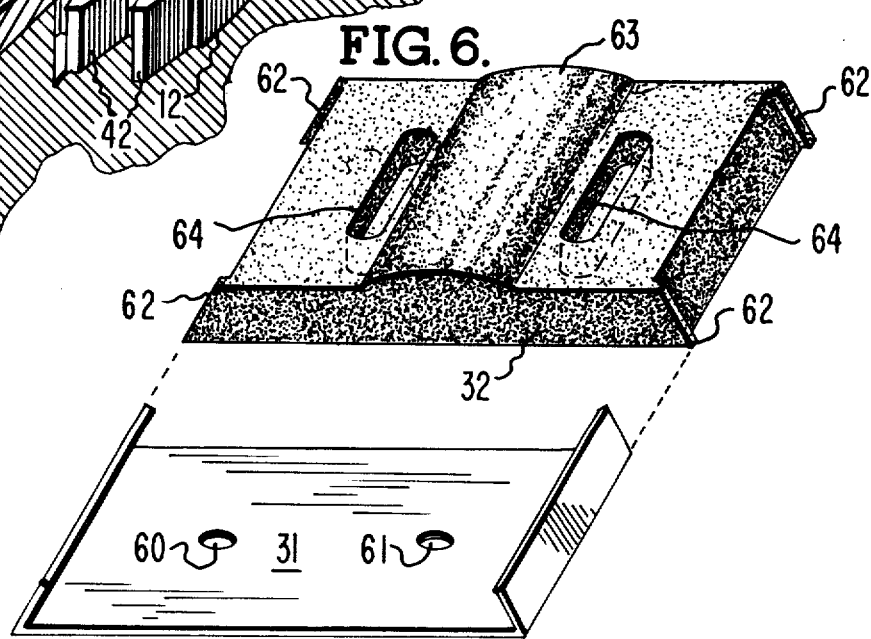
FIG. 6 is a perspective view of the parts of the lubricating device of FIG. 1.

FIGS. 2 and 6 show in detail the chain printer lubricating device 30 which is mounted in a depression 23 in the hard, smooth support surface 12. A metal bracket 31 is permanently mounted by bolts, such as at 60 and 61, or other suitable mounting means to the casting 11. A piece of flexible, microporous, polymeric material 32, such as nitrile rubber, is located in the bracket 31. The flexible material 32 may be bent for insertion into the bracket 31. The microporous material has ears 62 on each corner for interlocking with the bracket to hold the material 32 in place. The microporous material 32 has a raised convex arcuate surface 63 for contacting the surface of the links that normally contacts the hard, smooth support surface as the links pass thereby. The size of the surface area of the material 32 which comes into contact with the chain helps to determine the level of lubrication provided. The microporous material has hollow depressions 64 on either side of the convex surface 63. Such depressions do not extend completely through the material 32 and serve as charging reservoirs for lubricating liquid.

Nitrile rubber microporous material 32 may be formed into an appropriate shape by cutting it or perhaps molding it. The nitrile rubber microporous material has a surface that is highly abrasion resistant and nonburnishing. That is, as the chain rotates at a linear velocity of 210 inches per second, the raised surface 63 contacts (is hit by) approximately one million individual links per hour. It has been found that the nitrile rubber microporous pad 32 wears slightly, but is generally abrasion resistant and non-burnishing after several hundred hours of normal printer operation. The charging reservoirs 64 may be filled at normal maintenance intervals (such as once a month) and the microporous material replaced at longer intervals (such as every several months). The charging reservoir accepts refilling lubricant and the lubricant readily diffuses into the microporous material.

The size of the micropores in the microporous material is selected to maintain the desired level of lubricant between the line printer character chain and the hard, smooth support surface. Such selection of micropore size of course depends on the lubricating liquid used. In general, a preferred range of micropores is between 2 microns and 50 microns in diameter. In the preferred embodiment, the microporous material is nitrile rubber, manufactured by the Micro-Well Division of Monarch Marking which is a division of Pitney Bowes under the name Micro-Well, and has micropores approximately 20 microns in diameter; and the corresponding lubricating liquid is Shell Tellus Lubricating Oil No. 32.

EXAMPLE

An example of microporous polymeric material and liquid lubricant according to the present invention is provided. The microporous, polymeric material (designated 32) can be nitrile rubber manufactured under the name Micro-Well and has micropores approximately 20 microns in diameter therein. The nitrile rubber may be 3.375 inch (85.7 mm) long and 1.62 inch (41.1 mm) wide. The nitrile rubber may have a top flat surface 0.379 inch (9.6 mm) above its base with the curved arcuate surface (designated 63) extending 0.06 inch (1.5 mm) above such top flat surface. The curved arcuate surface may have a radius of curvature of 2.0 inches (50.8 mm). The depressions for holding the oil (designated 64) can be located equidistant from and on either side of the curved arcuate surface on 1.37 inch (34.8 mm) centers in the length dimension. Such depressions may be 0.25 inch (0.64 mm) in the material length dimension, 0.88 inch (22.4 mm) in the material width dimension and extend into the material from the top flat surface 0.319 inch (8.1 mm). The nitrile rubber may be impregnated with, and the depressions may be filled with, Shell Tellus Lubricating Oil No. 32. The nitrile rubber may have suitable ears on each corner for engaging a mounting bracket to hold the nitrile rubber stationary with respect to the hard, smooth support surface.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. In a line printer character chain mechanism having a hard, support surface about which a printer character chain is rotated, a lubricating device for providing an accurate amount of lubricant between the character chain and the hard support surface, the lubricating device being located in a depression in the hard support surface and comprising a piece of flexible, microporous, polymeric material that is impregnated with a liquid lubricant nonreactive to the polymeric material has at least one depression formed therein that serves as a charging reservoir for the liquid and has a smooth convex arcuate surface for contacting the character chain, and means for semipermanently mounting the polymeric material in the depression in the support surface to provide at least a portion of the polymeric material in contact with the character chain as it passes thereby in rotation such that the polymeric material will maintain a desired amount of lubricant between the support surface and the side of the character chain normally in contact therewith.

2. The line printer character chain lubricating device according to claim 1 wherein the polymeric material is nitrile rubber.

3. In a line printer having a character chain printing mechanism wherein the character chain rotates about a hard smooth support surface and print hammers are selectively actuated to impact printable paper toward the moving character chain with an ink ribbon between the paper and the character chain, a lubricating device for providing an accurate amount of oil between the rotating character chain and the hard smooth support surface, the lubricating device being located in a depression in the support surface and comprising a piece of flexible, abrasion-resistant, microporous, polymeric material that has a depression therein which serves as a charging reservoir for the lubricating oil and is impregnated with a lubricating oil non-reactive to the polymeric material, the polymeric material having a smooth convex arcuate surface for contacting the character chain and having micropores between two microns and fifty microns in diameter, and a bracket for semipermanently mounting the polymeric material in the depression in the support surface such that the smooth convex arcuate surface of the polymeric material contacts the side of the character chain that normally contacts the hard smooth support surface to maintain a desired amount of lubricating oil between the hard, smooth support surface and the side of the character chain normally in contact therewith.

4. A line printer character chain lubricating device according to claim 3, wherein the polymeric material is nitrile rubber.

* * * * *